Figure 1:
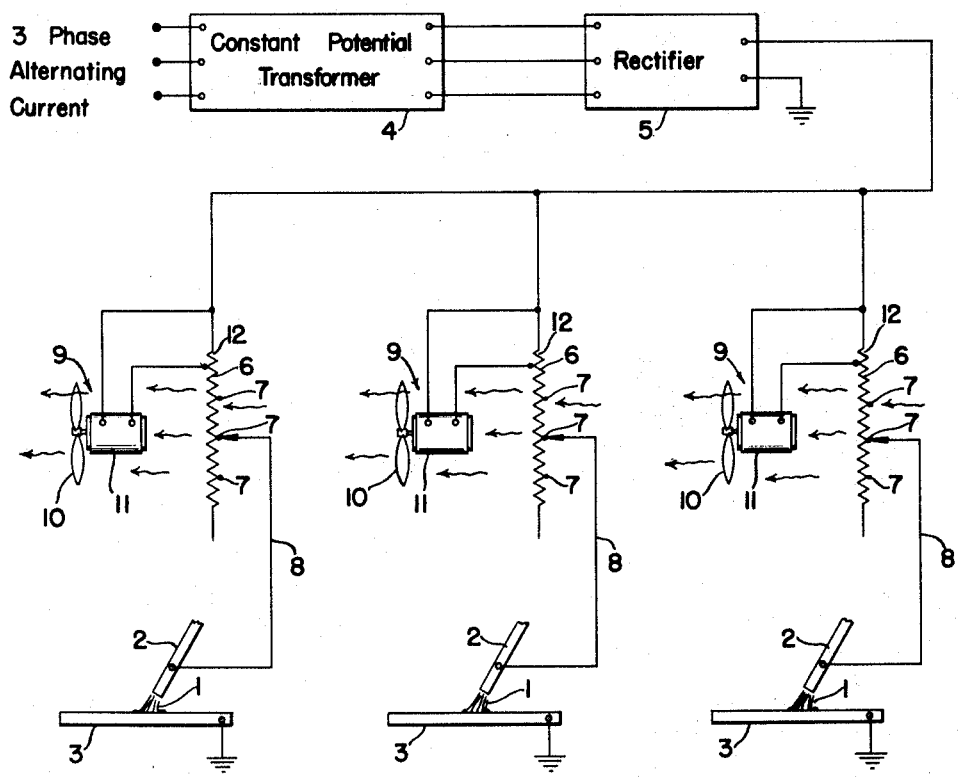

May 25, 1965

A. E. JOHNSON 3,185,918

RESISTANCE CONTROLLED REGULATING SYSTEM FOR
MULTI-ARC WELDING APPARATUS

Filed June 27, 1960

INVENTOR.
ARTHUR E. JOHNSON
BY
Andrus + Starke
Attorneys

United States Patent Office 3,185,918
Patented May 25, 1965

3,185,918
RESISTANCE CONTROLLED REGULATING SYSTEM FOR MULTI-ARC WELDING APPARATUS
Arthur E. Johnson, Elkhorn, Wis., assignor to A. O. Smith Corporation, Milwaukee, Wis., a corporation of New York
Filed June 27, 1960, Ser. No. 39,131
5 Claims. (Cl. 323—68)

This invention relates to multi-arc welding apparatus having a single power supply furnishing power to a plurality of individually controlled welding arcs.

The incoming voltage on conventional distribution power lines is too high for arc welding. Consequently, a transformer which is adapted to reduce the incoming voltage to a voltage suitable for arc welding is conventionally employed. In a multi-arc welding system, a single transformer power supply, normally of the constant potential variety, furnishes power to a plurality of individually controlled arcs connected in a parallel output circuit. Practically, 30 arcs can be operated from a single power source.

Multi-arc welding presently employs direct current power and therefore a suitable full wave rectifier is connected directly to the output of the power supply. The rectifier changes the alternating current input to substantially direct current which is then impressed upon the several arcs.

The current in the several arcs are individually controlled by an adjustable resistance means which is individually connected in series with each arc circuit. Suitable switch means are provided on the resistance to individually adjust the current to the corresponding arc.

The parallel connection of the several series connected resistance means and arcs maintains each independent of the other under all normal conditions pertinent to this present invention. The resistance means also establishes the normal dropping characteristics, that is, a decrease in voltage with an inrcease in current which is required for maintenance of a stable arc.

Although direct current in the conventional multi-arc welding current, alternating current can also be employed. Separate reactance control winding would preferably be employed in each individual arc branch circuit to establish a control impedance for selective setting of the alternating current to the corresponding arc.

In either multi-arc welding system, the control units should be light, compact and sturdily constructed to allow relocating of the unit to different welding locations. However, the welding currents generate substantial quantities of heat in the control unit and they are conventionally constructed in sufficient size to allow for heat dissipation.

Thus, the resistance control means conventionally consists of a plurality of resistant coils formed of a suitable high resistance conductor. The coils are mounted in spaced relation within an open mesh casing which allows dissipation of the sheet. The control means is consequently relatively bulky and is not readily transported from one welding location to another.

The present invention provides forced air cooling of the control elements in direct proportion to the corresponding arc welding current for all of the several ranges for each arc.

Generally, in accordance with the present invention, a low-voltage fan motor is connected directly across a suitable portion of the control element to operate the fan in direct proportion to the current through the element. The fan motor is connected to the element between the power source connection and the first possible connection on the element to the high voltage electrode to continuously pass air over the coils for all possible current ranges.

With the forced air cooling of the present invention the current capacity of the control element can be substantially reduced for any given rating because of the improved heat dissipation. The cooling is in direct proportion to the arc welding current and consequently in accordance with the heat generated.

The small motor is inexpensive and readily available commercially.

The present invention consequently establishes a small and compact control unit which may be easily and quickly transported by the welder without undue strain or the necessity for a supporting vehicle.

The drawing furnished herewith illustrates the best mode presently contemplated for carrying out the invention.

Figure 2:
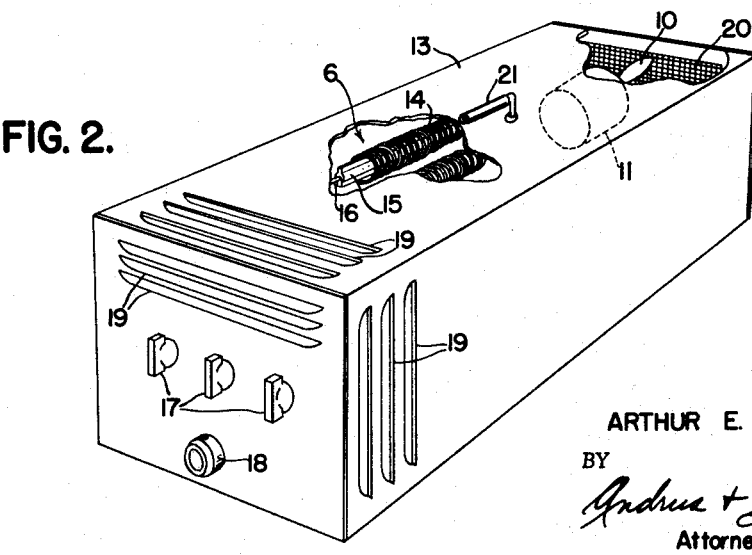

In the drawing:

FIG. 1 is a schematic circuit diagram of a multi-arc welding system illustrating the present invention; and FIG. 2 is a perspective view of a grid unit constructed in accordance with the present invention.

Referring to the drawings and particularly to FIG. 1, a direct current multi-arc welding system is shown including a plurality of individual arcs 1 established between a corresponding electrode 2 and workpiece 3. The power is supplied to establish and maintain arcs 1 from a constant potential transformer 4 having a rectifier 5 connected to the output to establish a direct current suitable for arc welding. The constant potential transformer 4 is connected to a three-phase power line circuit, not shown, in the conventional manner and is adapted to reduce the voltage to a level suitable for maintaining arcs 1.

The several arcs 1 are similarly connected to the output of the rectifier 5 in individual parallel circuits and consequently only one of the parallel circuits is described in detail. Corresponding elements in the other circuits are given corresponding numbers in accordance with the similarities in the circuits.

A dropping resistance grid 6 is connected in series with the electrode 2 and workpiece 3. A plurality of taps 7 are provided on the grid 6 and selectively connected to the electrode 2 by a suitable cable 8. The current flow to the arc 1 varies with the amount of the resistance connected in the circuit. Thus, if the electrode cable 8 is connected to the uppermost tap 7 shown in FIG. 1, a relatively small portion of the resistance grid 6 is connected in circuit and the total resistance of the circuit is low. Consequently, transformer maximum current flows in the arc 1.

If the electrode cable 8 is connected to either of the other two illustrated taps, an increased portion of the resistance is connected in the circuit. Consequently, as the total resistance of the circuit increases the arc current decreases accordingly.

The current flow through the resistance grid 6 establishes heat generally directly in proportion to amplitude of current.

In accordance with the present invention, a fan 9 is mounted adjacent the resistance grid 6 to establish forced cooling of the grid 6 and substantially extend the life of the grid.

The illustrated fan 9 is shown as an axial flow type having a fan blade 10 coupled to an output shaft of a small direct current motor 11. The motor 11 is connected across a small base portion 12 of grid 6 between the output rectifier 5 and the maximum current tap 7, shown in FIG. 1 as the uppermost tap 7. Consequently, the fan motor 11 is connected in circuit regardless of the tap connection.

The motor 11 is preferably a high resistant variety and the resistance inserted in the circuit is consequently negligible and does not noticeably affect the operation of the circuit.

Referring particularly to FIG. 2 of the drawing, a perspective view of a preferred construction of a grid unit incorporating the resistance grid 6 is illustrated.

The unit includes a sheet metal casing 13 enclosing a series of individual resistant coils 14 which constitute the resistance grid 6. Each resistance coil 14 is wound upon a suitable porcelain support 15 and mounted within the casing 13 by a longitudinally extending and highly temperature resisting mounting rod 16.

The taps 7 of FIG. 1 are shown in FIG. 2 as comprising a series of switches 17 which are adapted to selectively connect the individual coils 14 in series with an electrode cable tap 18 also mounted on the front wall of the housing. The electrode cable 8 is provided with a suitable jack, not shown, to enter the tap 18 and connect the electrode 2 to the desired tap.

A plurality of louvers 19 are formed in the front, top and side walls of the casing to allow entrance of air into the casing 13. The rear wall of the casing 13 is closed with a screen cover 20 to establish axial air flow through the casing 13.

The fan 9 is mounted in the rear portion of the casing 13 and is adapted to draw air inwardly through the louvers 19 and over the coils 14. The air is discharged through the back wall screen 20. The motor 11 is generally mounted coaxially of the resistor coils 14 and establishes the air flow in accordance with the current flow through the coils 14 as previously described.

A handle 21 is secured to the top wall of the casing 13 for carrying the unit to the required welding station.

The grid unit may be substantially completely enclosed to prevent the depositing of foreign matter upon the resistor coils. Further, the danger of injury to personnel because of contact with the assembled unit is essentially eliminated.

Although a direct current circuit and corresponding grid unit is illustrated, a corresponding forced air cooled reactor for an alternating current multi-arc circuit is equally within the scope of the present invention as set forth in the claims.

The present invention provides an inexpensive and long life control unit which is highly portable for multiple arc welding systems.

Various modes of carrying out the invention are contemplated as being within the scope of the following claims particularly pointing out and distinctly claiming the subject matter which is regarded as the invention.

I claim:

1. A current control device for a multi-arc welding system having a single power source, for establishing a plurality of paralleled arc circuits, said current control device being adapted to control current in one of said arc circuits and comprising an impedance unit including a base portion and an adjustable portion connected in series and adapted to be connected between the power source and one welding station to individually control the current to the corresponding arc with said base portion being adapted to be connected directly to the power source, and an electrically operated cooling fan including a motor connected across at least a portion of the base portion of the impedance unit to supply current to the arc and to the motor in series with said adjustable portion and thereby to establish cooling of the corresponding impedance incident to and in proportion to the corresponding arc current.

2. A current control device for an integrated multi-arc welding system having a single constant potential power source, for supplying current to a plurality of paralleled arc circuits, said current control device being adapted to control current in one of said arc circuits and comprising a resistance grid assembly including a base portion and an adjustable series connected portion adapted to be connected between the constant potential power source and one welding station to individually control the current to the corresponding arc with said base portion being directly connected to the power source, and an electrically operated cooling fan including a small direct current motor connected across at least a portion of the base portion of the corresponding grid to supply current to the arc and to the motor in series with said adjustable portion and thereby to establish cooling incident to and in proportion to the corresponding arc current.

3. A current control device for a multi-arc welding system having a single constant potential power source, for supplying current to a plurality of paralleled arc circuits, said current control device being portable and adapted to control current in one of said arc circuits and comprising an impedance unit including a base portion and an adjustable series connected portion adapted to be connected between the constant potential power source and one welding arc circuit to individually control the current to the corresponding arc, said base portion being adapted to be connected to the power source, a substantially closed housing supporting said impedance unit and having openings in the housing adjacent opposite ends of the impedance unit to direct air flow through the housing over the impedance unit, a fan mounted within the housing to establish a high velocity air flow through the housing, and said fan including an electrical drive means connected across at least a portion of the base portion of the impedance unit for energization incident to establishment of an arc.

4. A current control device for a multi-arc welding systems having a single constant potential power source, for supplying current to one of a plurality of paralleled arc circuits, said device comprising an impedance unit including a base portion and an adjustable series connected portion adapted to be connected between the constant potential power source and one welding station to individually control the current to the corresponding arc, said base portion being connected to the power source, a sheet metal housing for enclosing said impedance unit independently of said power source and having openings adjacent the front and rear portion of the housing establishing a restricted air passageway through the housing and over the impedance unit, an axial flow fan having a small drive motor mounted within the housing to establish a high velocity air flow through the passageway, and means connecting said drive motor across the base portion of the impedance unit for energization incident to establishment of an arc by the corresponding arc circuit.

5. In a multi-arc welding system having a single power source for supplying current to a plurality of paralleled arc circuits each of which includes an air cooled current device, the improvement in each of said devices comprising a current control resistance means including a fixed base resistance portion and an adjustable series connected resistance portion adapted to be connected to the constant potential source and an arc to provide and establish one of said paralleled arc circuits, a housing enclosing said resistance means and substantially corresponding in size to the configuration thereof, said housing having openings on opposite sides of the resistance unit and constituting an air passageway between said openings, an axial flow fan having a small drive motor, said fan being mounted within the housing adjacent one of said openings, and means connecting said drive motor across said base resistance portion for energization in accordance with the current supply to the corresponding arc and establishing a relatively high velocity air flow through the air passageway defined by said housing to cool the corresponding resistance means.

References Cited by the Examiner

UNITED STATES PATENTS

| 2,757,329 | 7/56 | Lichtenfels | 318—333 |
| 2,790,122 | 4/57 | Powers et al. | 318—333 |
| 2,873,356 | 2/59 | Carroll et al. | 219—131 |

FOREIGN PATENTS 419,042  11/34  Great Britain.

LLOYD McCOLLUM, *Primary Examiner.*

MILTON O. HIRSHFIELD, *Examiner.*